(12) United States Patent
Koike et al.

(10) Patent No.: US 6,430,367 B1
(45) Date of Patent: Aug. 6, 2002

(54) LENS-FITTED PHOTO FILM UNIT CAPABLE OF CHANGING OVER APERTURE STOP

(75) Inventors: Kazumi Koike; Takeshi Masuda; Yuji Mikami, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 3 days.

(21) Appl. No.: 09/716,939

(22) Filed: Nov. 22, 2000

(30) Foreign Application Priority Data

Nov. 26, 1999 (JP) .......................... 11-336503
Dec. 24, 1999 (JP) .......................... 11-367606

(51) Int. Cl.[7] .......................... G03B 17/02; G03B 17/00
(52) U.S. Cl. .............................. 396/6; 396/76; 396/493
(58) Field of Search .............................. 396/89, 6, 493, 396/72, 76

(56) References Cited

U.S. PATENT DOCUMENTS

| | | | | |
|---|---|---|---|---|
| 3,893,141 A | * | 7/1975 | Uno et al. | 396/356 |
| 4,217,044 A | * | 8/1980 | Yamazaki et al. | 396/290 |
| 4,615,600 A | * | 10/1986 | Nakajima et al. | 396/259 |
| 5,574,555 A | * | 11/1996 | Yamaguchi et al. | 250/201.2 |
| 5,628,039 A | * | 5/1997 | Muramatsu et al. | 396/296 |

FOREIGN PATENT DOCUMENTS

JP 60-235112 * 11/1985

* cited by examiner

Primary Examiner—D Rutledge
(74) Attorney, Agent, or Firm—Young & Thompson

(57) ABSTRACT

A first lens element and a second lens element for comprising a photographic lens, and a stop opening are arranged on an optical axis in this order. A stop plate has a stop-down opening. The stop plate is movable between a first position where the stop-down opening is inserted on an optical axis between the first and the second lens elements for making an f-number of the photographic lens f1, and a second position where the stop-down opening is retracted from the optical axis for making the f-number f2. The photographic lens is constructed to satisfy the following conditions:

$$|\log_2(L/100)| < 1.9$$

$$0 < E \leq 2 - 0.91 \times |\log_2(L/100)|$$

wherein L(%) represents a proportion of brightness in a marginal portion of a frame to brightness in a central portion of the frame at the time when the stop-down opening is inserted, and E(EV) represents the difference between the maximum exposure amount and the minimum exposure amount in the marginal portion of the frame.

14 Claims, 19 Drawing Sheets

SPHERICAL ABERRATION

CURVATURE OF THE FIELD

LENS-FITTED PHOTO FILM UNIT CAPABLE OF CHANGING OVER APERTURE STOP

BACKGROUND OF THE INVENTION

1. Field of the Invention

The present invention relates to a lens-fitted photo film unit having a exposure control mechanism by stop changeover, more particularly, the present invention relates to a lens-fitted photo film unit preventing deterioration of image quality due to change of the stop position.

2. Background Arts

A variety of lens-fitted photo film units, having a preloaded photo film and photographic mechanisms like a photographic lens and a shutter mechanism, are manufactured and sold. In order to reduce the manufacturing cost, the lens-fitted photo film unit, hereinafter called simply film unit, is comprised as simple as possible. For instance, a lens holder having a fixed stop opening and a struck-type shutter blade are applied to the film unit. The values of f-number and shutter speed are fixed, and the photographing condition is also fixed.

Therefore, under a severe photographing condition, there is a case where an exposure amount is out of the latitude. In under-exposed condition, a printed image is blurred and low-contrasted, and the graininess becomes worse. In over-exposed condition, on the other hand, it requires much time to expose to a photographic paper in the printing operation.

Recently, since an inexpensive camera like a film unit is required to improve its performance, some mechanisms for changing the photographing condition is considered. For instance, a stop control mechanism according to subject brightness, and a mechanism for changing photographic lenses with different focal lengths according to the subject distance. Since a complex or an expensive mechanism is not be applicable to a cheap camera like a film unit, exposure changeover mechanism by means of moving a stop plate with a stop-down opening is applied to the film unit.

For instance, as illustrated in FIGS. 15A and 15B, when a shutter blade 103 is disposed at the rear of a lens barrel 102 having a pair of photographic lenses 100 and 101, and inserting and retracting a stop plate 104 having a stop-down opening between photographic lenses 100 and 101, a problem described below occurs, because the stop openings are located at the different positions on the optical axis.

As illustrated in FIGS. 15A and 16A, when the stop plate 104 is in the retracted position, fluxes of incident light focusing on an edge of a photo film 105 are overlapped in the shutter blade 103. As illustrated in FIGS. 15B and 16B, on the other hand, when the stop plate 104 is in the inserted position, each flux is separated at the shutter blade 103.

A shutter mechanism applied to film unit, as illustrated in FIG. 17, an exposure is done when a shutter blade is struck and it moves in rotational fashion clockwise. Among the five fluxes of incident light irradiated on the shutter blade, shown with hatched lines in FIG. 17, the time when the left lower flux is cut by the shutter blade is longer than that of the upper right one. The exposure on a photo film by the lower left flux is less than that by the upper right one. Therefore, when fluxes are separated on a shutter blade due to inserting a stop-down opening, exposure unevenness is likely to be conspicuous.

To solve this problem, it is preferable to dispose a shutter blade moveable along the optical axis, and to move the shutter blade when the stop plate is inserted or retracted. However, it is difficult to move the position of the shutter blade, because the shutter blade is required to keep a film chamber dark and it is a member rendering by shutter release operation.

As illustrated in FIGS. 18A and 18B, in changing over photographic lenses with different focal lengths, same problem described above occurs because the optimum positions of stop openings are different. When a wide-angle lens 106 is used, as illustrated in FIG. 18A, fluxes focused on an edge of a photo film 105 are overlapped in the shutter blade 103. On the other hand, when a telephoto lens 107 is used, as illustrated in FIG. 18B, fluxes are separated in the shutter blade 103. For the same reason described above, exposure unevenness is likely to occur.

It is necessary for reducing the exposure unevenness to set the optimum positions equal between in the wide-angle state and the telescopic state, devising powers and positions of photographic lenses. It makes difficult to design the photographic lenses freely.

A photographic lens used in a film unit is designed so that the spherical aberration is corrected somewhat insufficiently to keep a balance of image quality between a peripheral area and a central area. However, because of the spherical aberration, the object distance is different when the exposure opening is inserted on the optical axis, to cause the shift of focus. In that case, it is hard to improve optical performance at any distance by inserting the stop-down opening.

Besides, a photographic lens used in the film unit is required to provide at a low cost, the chromatic aberration is corrected insufficiently. So, there is a case in which only the fluxes with large chromatic aberration can pass through the stop-down opening. In that case, it is hard to improve optical performance by inserting a stop-down opening.

SUMMARY OF THE INVENTION

In view of the foregoing, an object of the present invention is to provide a film unit that is able to reduce the effect of exposure unevenness by a stop changeover.

Another object of the present invention is to provide a film unit that is able to reduce the shift of the focus even at the time of a stop changeover.

To achieve the above object, a film unit is comprised of at least one photographic lens for forming an frame on a photo film, and a stop changer disposed on an optical axis of the photographic lens for controlling an amount of subject light, the stop changer being capable of changing over at least at a first position and a second position, making an f-number of the photographic lens f1 when at the first position, making the f-number of the photographic lens f2 when at the second position, wherein f2>f1;

the lens-fitted photo film unit satisfying the following conditions:

$$|\log_2(L/100)| < 1.9$$

$$0 < E \leq 2 - 0.91 \times |\log_2(L/100)|$$

wherein L(%) represents a proportion brightness in a marginal portion of the frame to brightness in a central portion of the frame at the time when the stop changer is at the second position, and E(EV) represents a difference between the maximum exposure amount and the minimum exposure amount in the marginal portion of the frame.

In the preferable embodiment of the present invention, the film unit is comprised of a photographic lens with two lens elements, and a exposure opening formed inside an unit body, and a stop plate having a stop-down opening which is smaller than the stop opening. The stop plate is movable into a position between the two lens elements. Since the section of incident light with large chromatic aberration is cut by the stop plate, the image quality improves.

According to the present invention, an exposure unevenness has a tendency not to be conspicuous when a marginal brightness is large, even if the exposure difference is large. Therefore, to determine the permissible range of marginal brightness for reducing an effect of exposure unevenness, it is possible to dispose the photographic lens and the shutter blade freely. It gets easier to design the photographic lens.

In the other preferable embodiment, a film unit comprises at least one photographic lens for forming an frame on a photo film, and a stop changer disposed on an optical axis of the photographic lens for controlling an amount of subject light, the stop changer being capable of changing over at least at a first position and a second position, making an f-number of the photographic lens f1 when at the first position, making the f-number of the photographic lens f2 when at the second position, wherein f2>f1;

the lens-fitted photo film unit satisfying the following condition:

$$\delta x \cdot f1/F < 0.06$$

wherein F(mm) represents paraxial focal length of the photographic lens, δx(mm) represents a shift of peak positions in MTF curves upon changing over the stop changer, satisfying the following condition:

$$u = 20 \times 21.63/DL$$

wherein u(lines/mm) represents a spatial frequency of the MTF curves, DL(mm) represents half a length of a diagonal line of the frame.

By determining the change of peak positions in MTF curves in a certain range, it is possible to reduce the fluctuation of focusing distance, and to improve optical performance at any distance by inserting the stop-down opening.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENT

Figure 1:
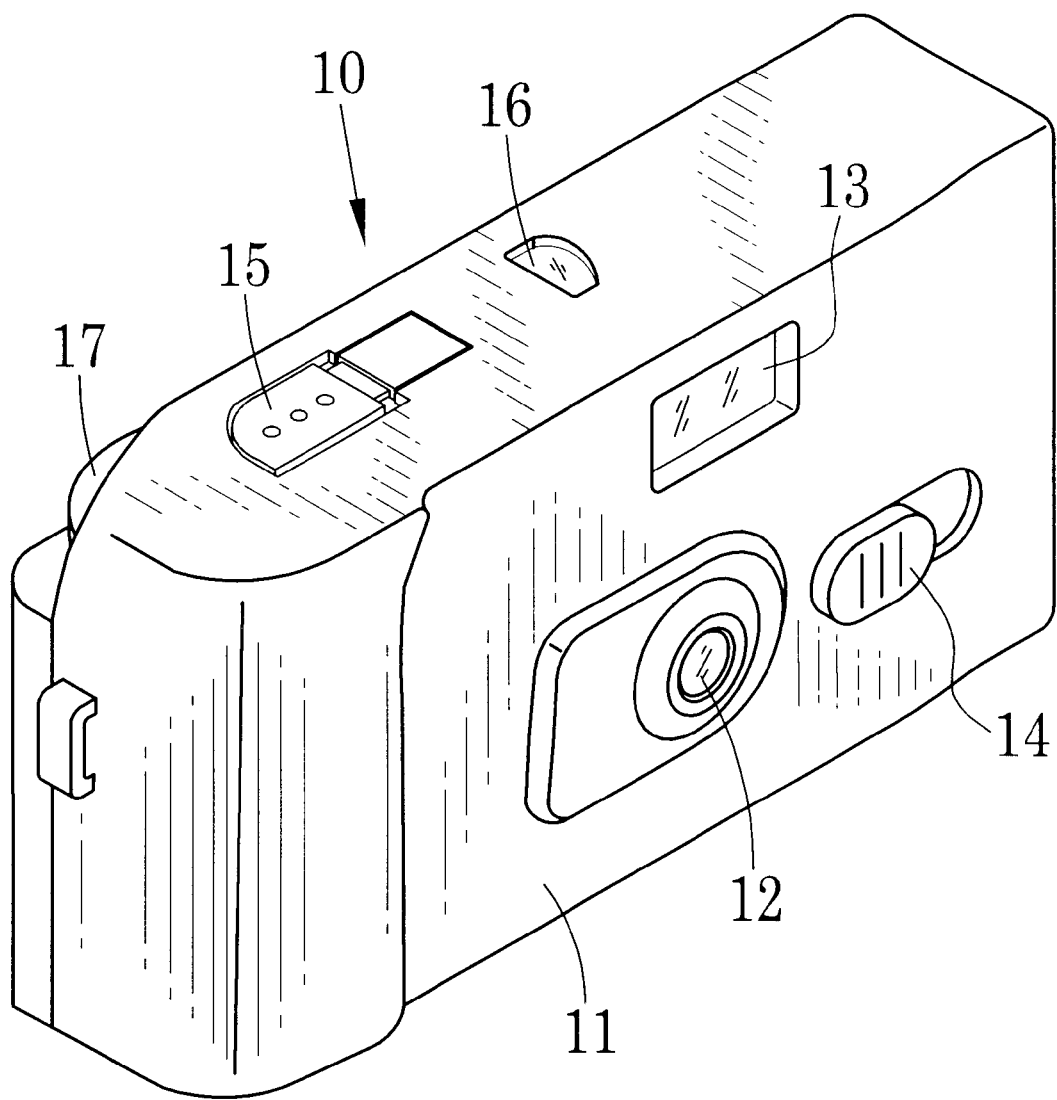
FIG. 1 is a perspective view of a lens-fitted photo film unit.

FIG. 1 is a perspective view illustrating a film unit. The film unit is comprised of a housing 10 having kinds of photographic mechanisms and a wrapping label 11 rolled around the housing 10. A photographic lens 12, a viewfinder 13, a changeover knob 14 are provided on a front wall of the housing 10. A shutter button 15 and a frame counter 16 are provided on the top wall, and a part of a winding wheel 17 emerges in the back wall of the housing 10.

Figure 2:
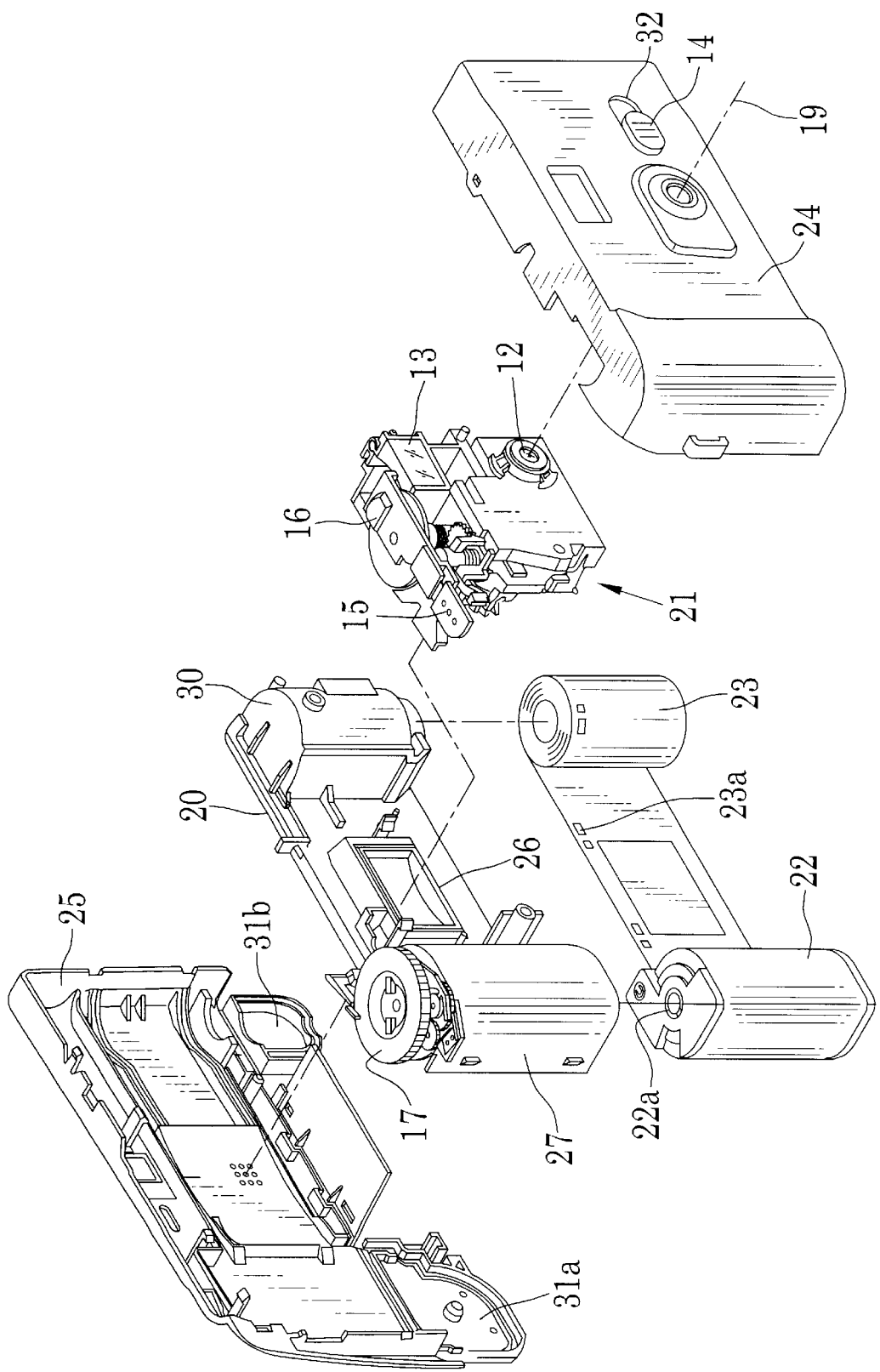
FIG. 2 is an exploded perspective view of a lens-fitted photo film unit.

The housing 10, as illustrated in FIG. 2, includes a basic portion 20, an exposure unit 21, a photo film cassette 22, a photo film 23, a front cover 24, and a rear cover 25. The basic portion 20 includes an exposure aperture 26 which determines the frame region on the photo film 23, and a cassette chamber 27 which contains the photo film cassette 22, and a film roll chamber 30 which contains a roll of the photo film 23.

The winding wheel 17 is rotatably attached to the top wall of the cassette chamber 27, and a shaft formed downwards therewith engages to a spool 22a that is contained in the photo film cassette 22. The end of the photo film 23 is fixed by coming into a silt (not illustrated) formed in the spool 22a. When the winding wheel 17 is rotated counterclockwise, the spool 22a also rotates and the photo film 23 is wound into the photo film cassette 22.

There are openings formed in the front cover 24 for emerging of the photographic lens 12 and the viewfinder 13 and so on. The front cover 24 and the rear cover 25 cover the inside of the film unit 10 in light-tight fashion. There are bottom lids 31a and 31b in the rear cover 25 to hold the bottom of the photo film cassette 22 and the rolled photo film 23 in light-tight fashion. The bottom lid 31a is opened in taking the photo film cassette 22 outside.

The changeover knob 14 is inside an opening 32 formed in the front cover 24. The opening 32 is longer in the horizontal direction. The changeover knob 14 is moveable between the left-hand position, hereinafter called the first position, and the right-hand position, hereinafter called the second position. The changeover knob 14 is held at the first or second position due to engagement of projections with a click, not illustrated in this drawing.

Figure 3:
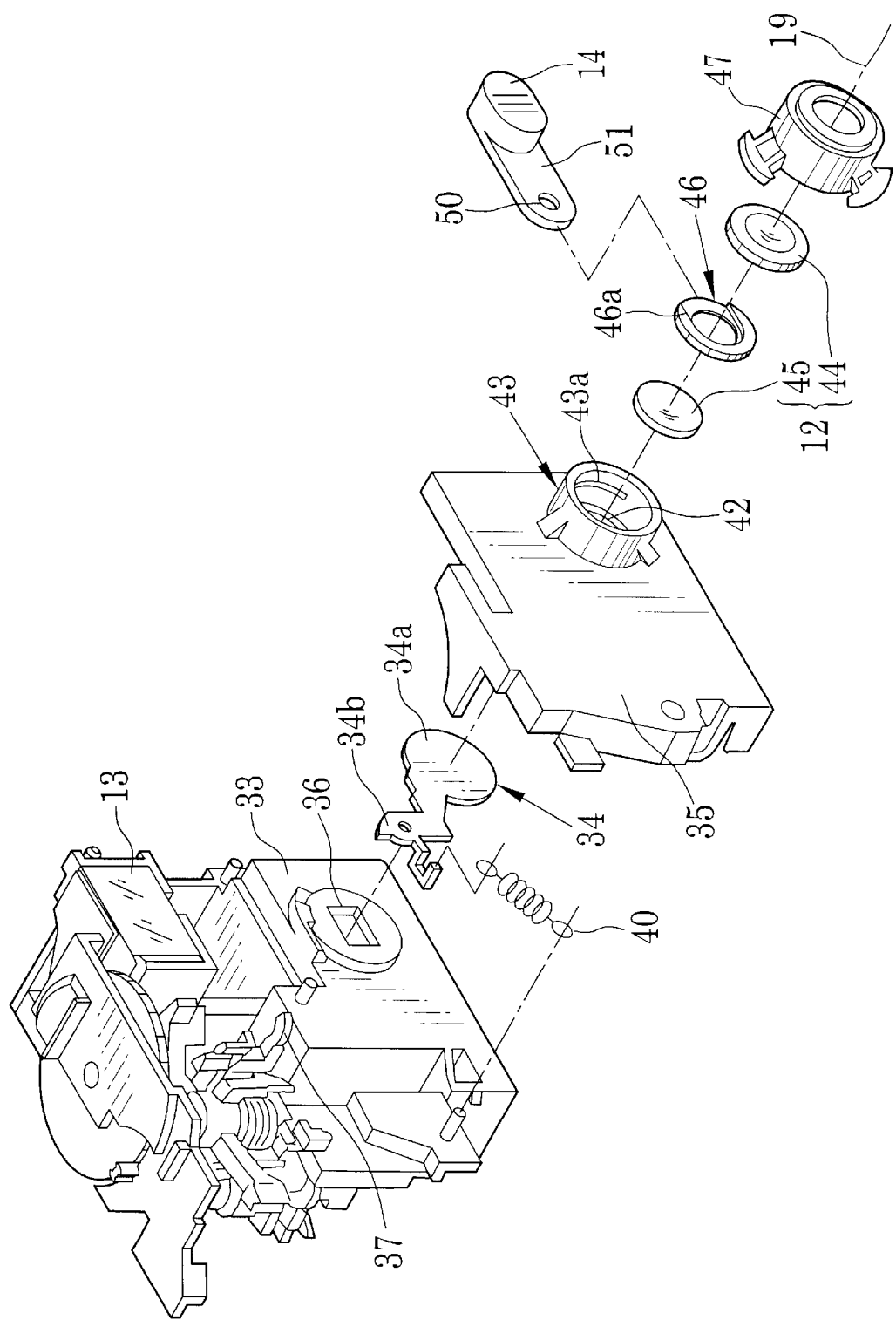
FIG. 3 is an exploded perspective view of an exposure unit.

As illustrated in FIG. 3, the exposure unit 21 has the changeover knob 14, an exposure tunnel 33, a shutter blade 34, a shutter cover 35 and so on. A shutter opening 36 is formed in the central area of the exposure tunnel 33, and there are a shutter lever 37, a shutter driving mechanism, an anti-winding mechanism, and so on, attached to the top of the exposure tunnel 33.

The shutter blade 34 includes a shutting portion 34a and a mounting portion 34b, and is rotatably attached to the wall of the exposure tunnel 33 around an opening formed in the mounting portion 34b. The shutter blade 34 is held by a bias of a spring 40 at the closed position, in which the shutting portion 34a lies on an optical axis 19 to block light. By depressing the shutter button 15, the shutter driving mechanism works, and the shutter lever 37 moves. Since the edge of the mounting portion 34b is struck by the shutter lever 37, the shutter blade 34 rotates toward the opened position against the bias of the spring 40. Then, the shutter opening 36 opens until the shutter blade 34 returns to the closed position by the bias of the spring 40. The swing time of the shutter blade 34 is set on a predetermined value, for instance 1/60 sec.

The shutter cover 35 is attached to the front side of the exposure tunnel 33 so as to cover the shutter blade 34. The shutter cover 35 has an exposure opening 42 as a first stop opening, and a lens barrel 43 is formed therewith and disposed around the exposure opening 42.

The photographic lens 12 is comprised of a first lens element 44 and a second lens element 45, and a ring-shaped spacer 46 is disposed between them. All of the elements are inside the lens barrel 43. The first lens element 44 is a meniscus lens with a convex surface directed to the object, and the second lens element 45 is a convex lens. There is a lens retainer 47 in front of the lens barrel 43. Since the lens retainer 47 presses the peripheral area of the first lens element 44, the photographic lens 12 is held between the shutter cover 35 and the lens retainer 47.

The spacer 46 is disposed in order to adjust the distance between the first and the second lens elements 44 and 45. A sheet member like a mylar sheet or a molded member can be used as the spacer 46, wherein it is preferable that the thickness is more than 0.2 mm in the former case, and more than 0.4 mm in the latter. Otherwise, by disposing a projection on the edge of the first lens element 44 or the second lens element 45, the spacer 46 can be omitted.

Figure 4:
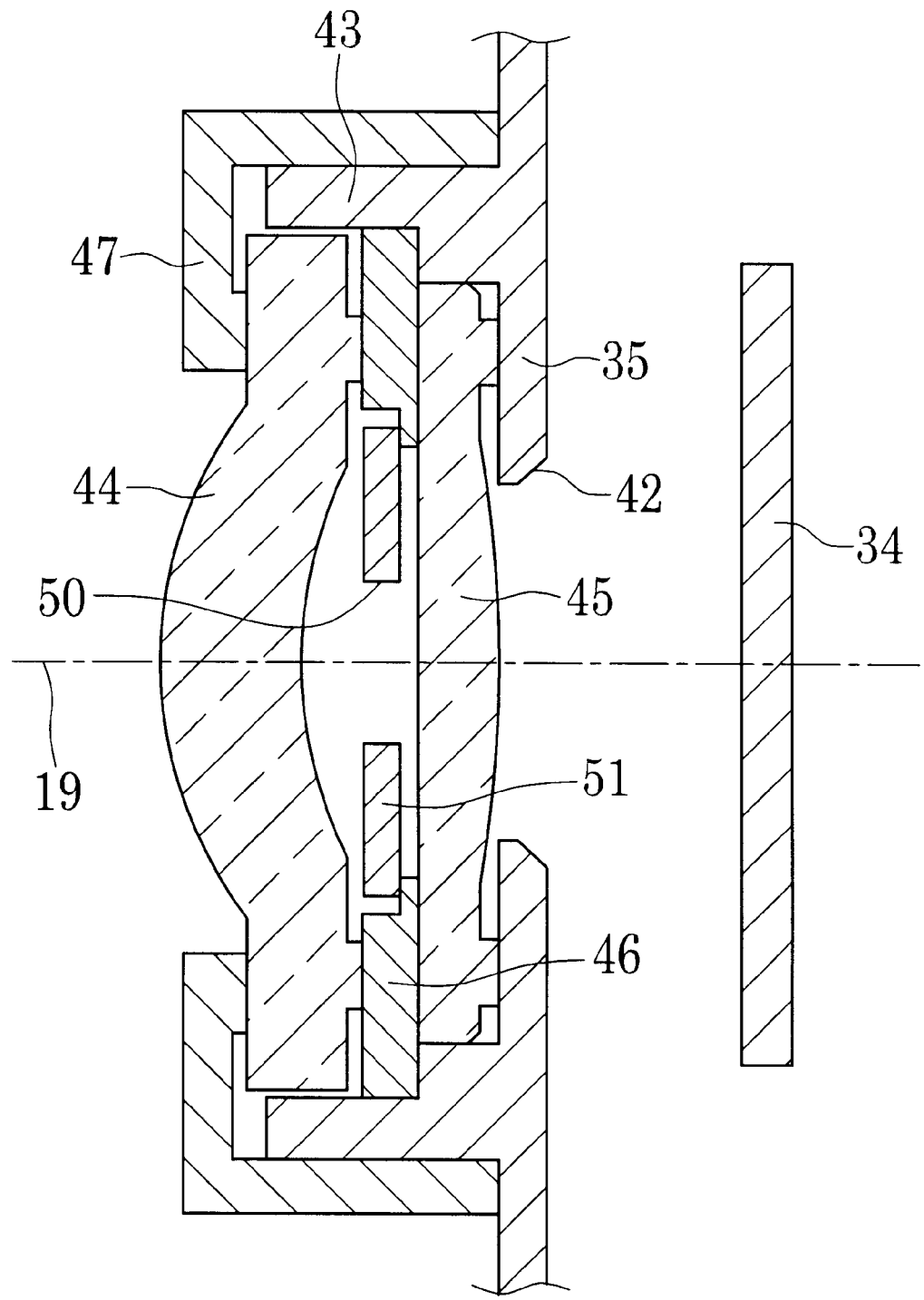
FIG. 4 is a sectional view of a lens barrel.

The changeover knob 14 is formed with a stop plate 51, in which a stop-down opening 50, smaller than the exposure opening 42, is formed as a second stop opening. On the side of the lens barrel 43, a groove 43a is formed so that the stop plate 51 can be inserted herein. And, in the object side of the spacer 46, a recess 46a is formed so that the stop plate 51 can be inserted herein. As illustrated in FIG. 4, stop changeover is performed by inserting the stop plate 51 between the first and the second lens elements 44 and 45.

Figure 5A:
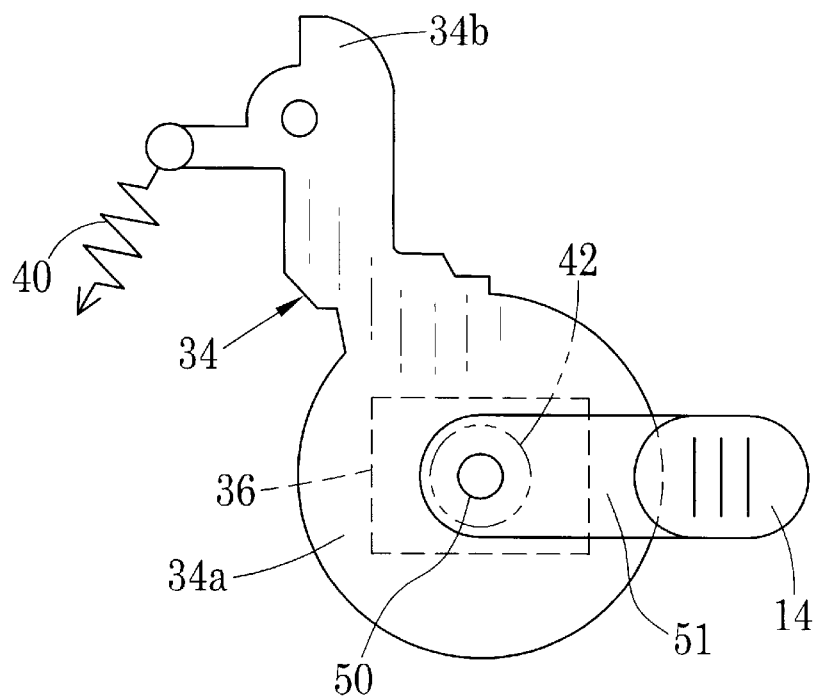
FIG. 5A is a schematic view illustrating the exposure unit, in which a stop-down opening is inserted on an optical axis.

As illustrated in FIG. 5A, when the changeover knob 14 is in the first position, the stop-down opening 50 is positioned on the optical axis 19, and the f-number of the photographic lens 12 is about 18. Then, the exposure amount is decreased by the stop-down opening 50, so it is possible to prevent over-exposed photography. On the other hand, when the changeover knob 14 is in the second position, the stop-down opening 50 is retracted from the optical axis 19, and the f-number is about 8. Then, the exposure amount is increased than that in stop-down situation, so it is possible to prevent under-exposed photography.

The photographic lens 12 is constructed to satisfy the following conditions:

$$|\log_2(L/100)| < 1.9 \tag{1}$$

$$0 < E \leq 2 - 0.91 \times |\log_2(L/100)| \tag{2}$$

wherein L(%) represents a proportion of brightness in a marginal portion of the frame to brightness in a central portion of the frame at the time when the stop-down opening 50 is inserted, and E(EV) represents the difference between the maximum exposure amount and the minimum exposure amount in the marginal portion of the frame.

Figure 6A:
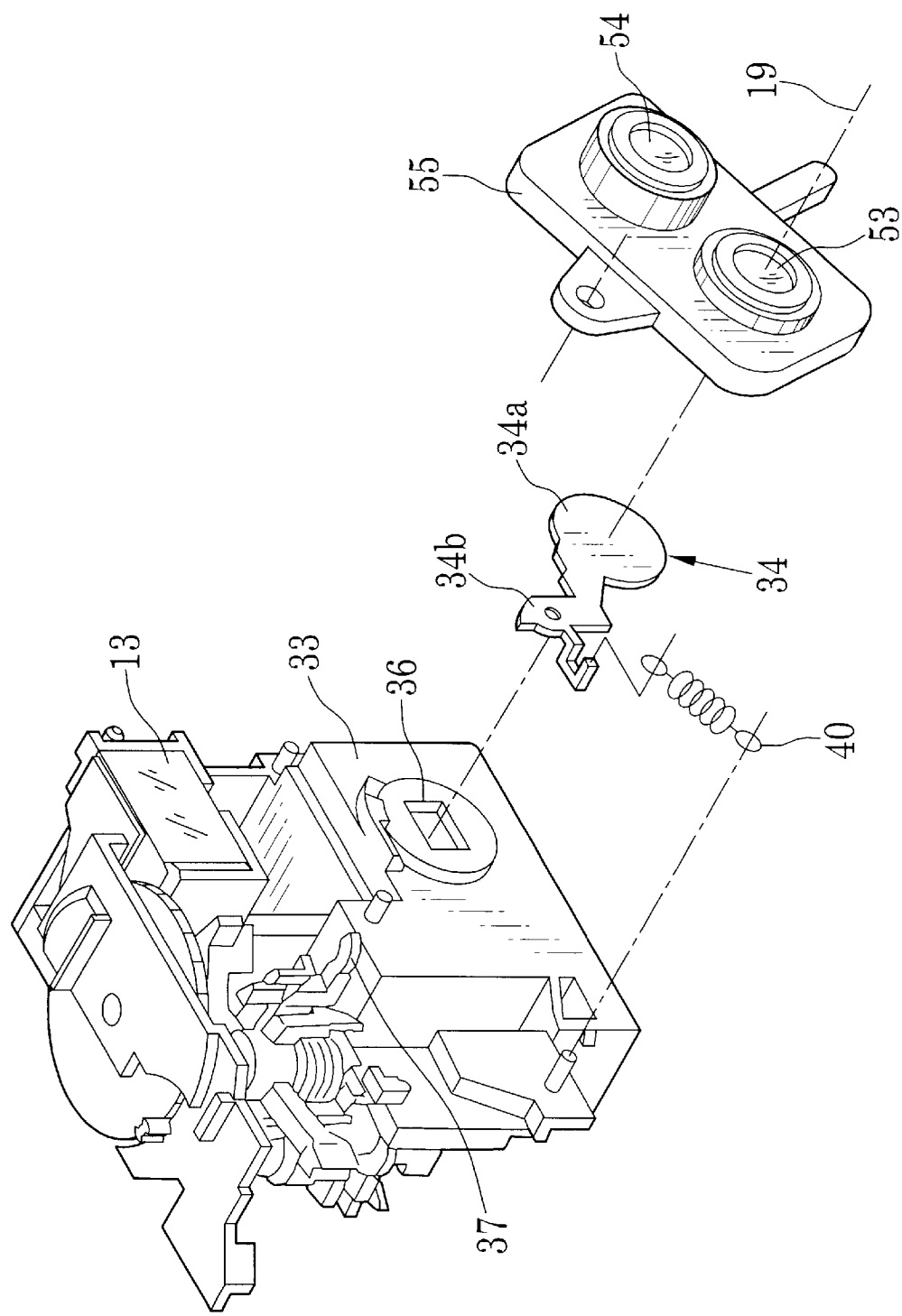
FIG. 6A is a perspective view of an exposure unit having two photographic lenses with different focal lengths.
Figure 6B:
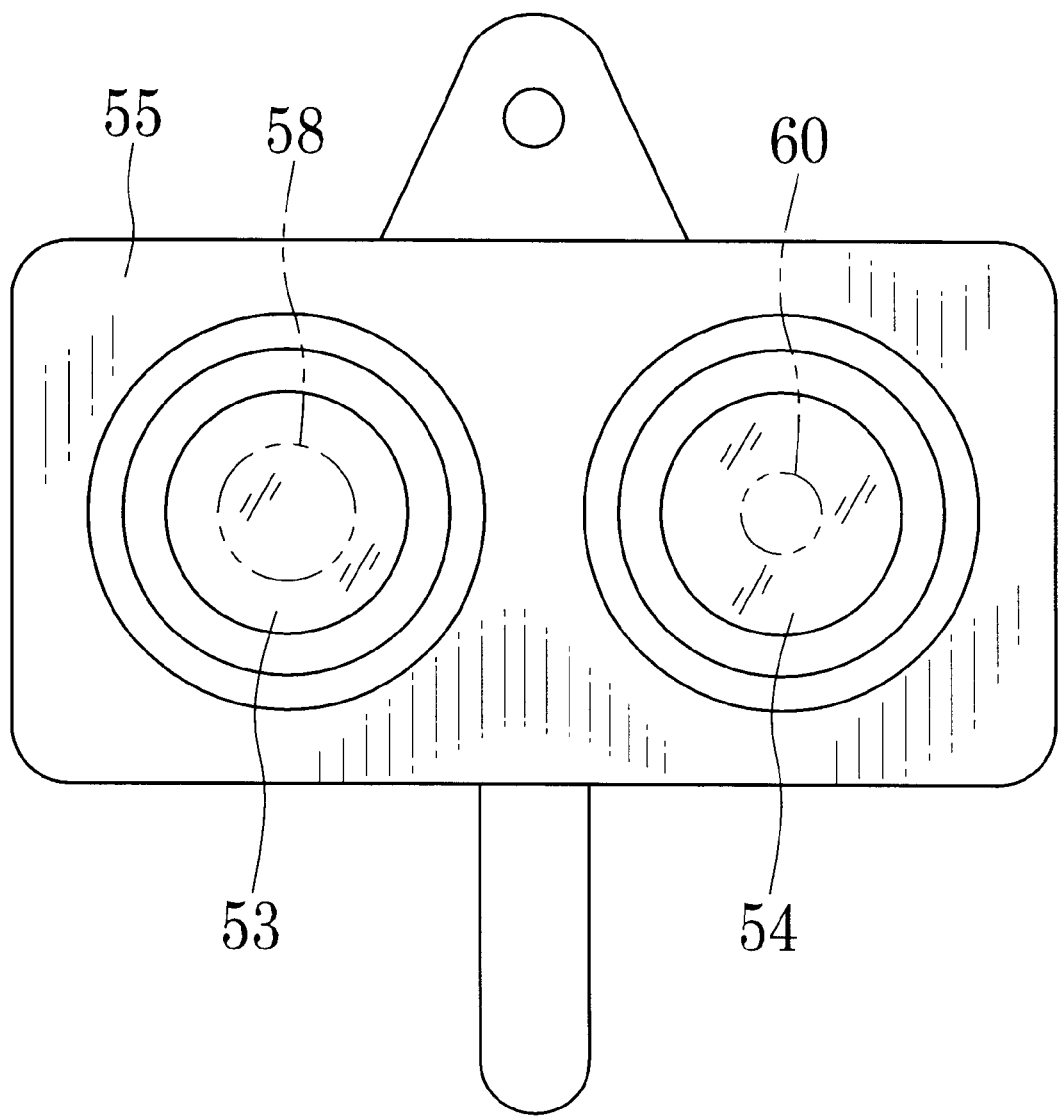
FIG. 6B is a schematic view illustrating the exposure unit having two photographic lenses with different focal lengths.

In this embodiment, the position of the stop opening changes by inserting and retracting the stop plate 51. Alternatively, as illustrated in FIGS. 6A and 6B, the present invention is applicable to the case where a first photographic lens 53 and a second photographic lens 54 with different focal lengths are mounted on a movable board 55, and to set the either lens on the optical axis 19 by moving the board 55. Since the focal lengths of photographic lenses are different, the optimum positions of stop openings are different from each other. Furthermore, a zoom lens can be used to change the focal length.

An example of this embodiment, in which numerical values are substituted, will be described below. Designated at F is the paraxial focal length of the photographic lens 12, f1 the f-number of the photographic lens 12 at the time when the stop-down opening 50 is retracted from the optical axis 19, f2 the f-number at the time when the stop-down opening 50 is inserted. The diameter of the shutter blade 34 is 8.98 mm, and the size of exposed area is 22.5×32.07 mm.

F=33.40 (mm)

f1=8.05 f2=18.00

L=57.90 (%)

In this case, the condition (1) is satisfied because $$|\log_2(L/100)| = 0.78 < 1.9$$

The parameters of the photographic lens 12 are shown in Tables 1 and 2. In Table 1, designated at i is the surface number indicating in the order from the object side, R(mm) the radius of curvature, D(mm) the thickness of lens elements or air space between adjacent lens elements, N the refractive index, d the dispersion, and r(mm) the effective radius.

TABLE 1

| i | R | D | N | d | R |
|---|---|---|---|---|---|
| 1 | 4.563* | 0.780 | 1.492 | 57.5 | 2.34 |
| 2 | 4.319 | 0.705 | | | 1.89 |
| 3 | stop-down opening | 0.600 | | | 0.82 |
| 4 | 80.689 | 0.780 | 1.492 | 57.5 | 1.83 |
| 5 | −24.124* | 0.000 | | | 1.83 |
| 6 | exposure opening | 1.200 | | | 1.82 |

The surface marked with * is an aspherical surface which is specified by the following equation:

$$Z=ch^2/[1+\sqrt{1-(1+K)c^{2h^2}}]+Ah^4+Bh^6+Ch^8+Dh^{10}$$

wherein c is a reciprocal number of the radius of curvature (c=1/R), h is the height of light path from the optical axis 19, and K, A, B, C and D are aspherical coefficients.

TABLE 2

| i | 1 | 5 |
|---|---|---|
| K | 0 | 0 |
| A | −0.695195E-03 | −0.808071E-03 |
| B | 0.154304E-03 | 0.234980E-03 |
| C | −0.381339E-04 | −0.373047E-04 |
| D | 0.261542E-05 | 0 |

Table 3 shows the exposure amount, which is represented in exposure value (EV), in the peripheral area of each frame area in the photo film relative to the central area. The exposure amount in each area is represented as the product of the marginal brightness L and the exposure time.

Figure 7:
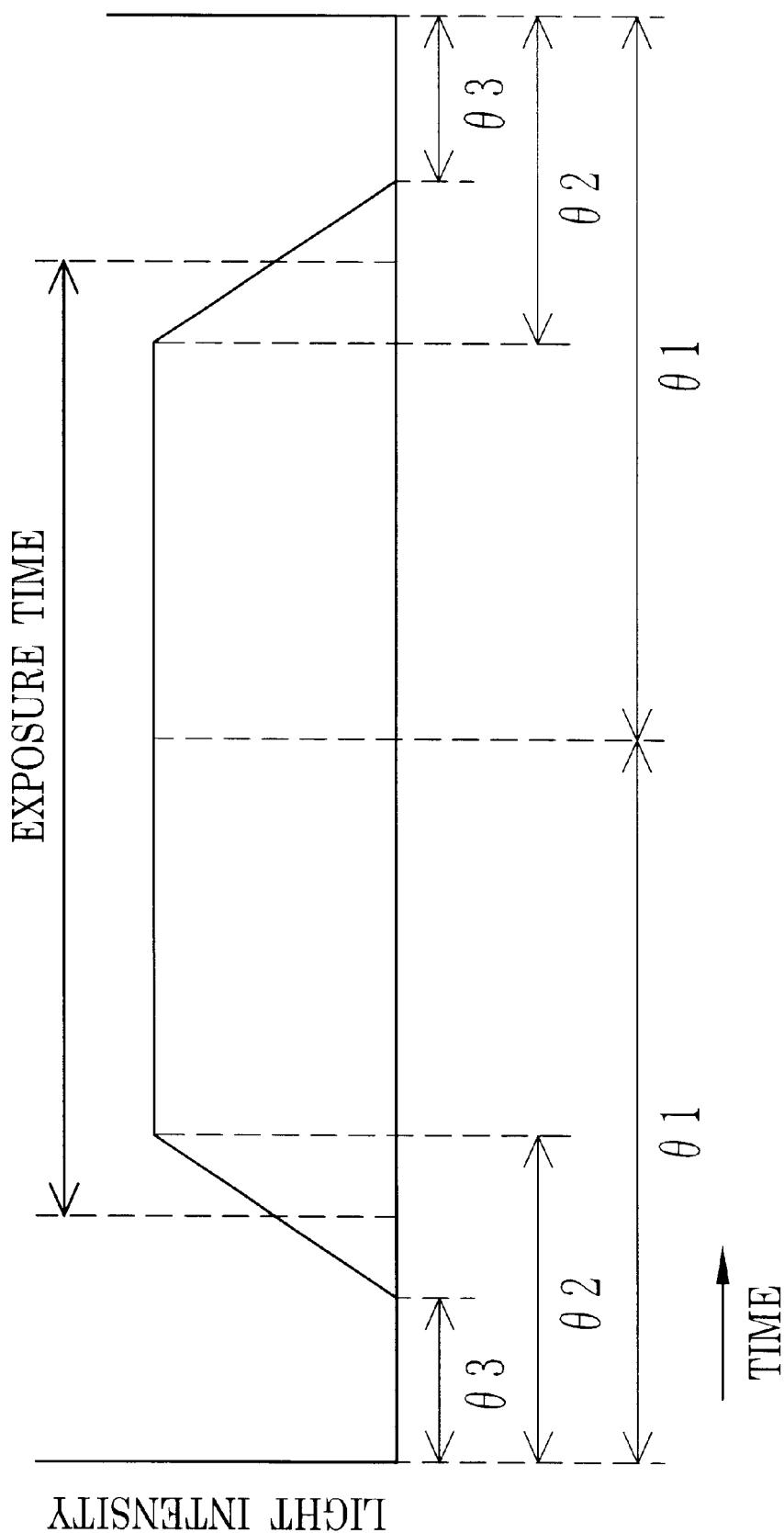
FIG. 7 is a graph illustrating a change of light intensity relative to the rotational angle of the shutter blade.
Figure 17:
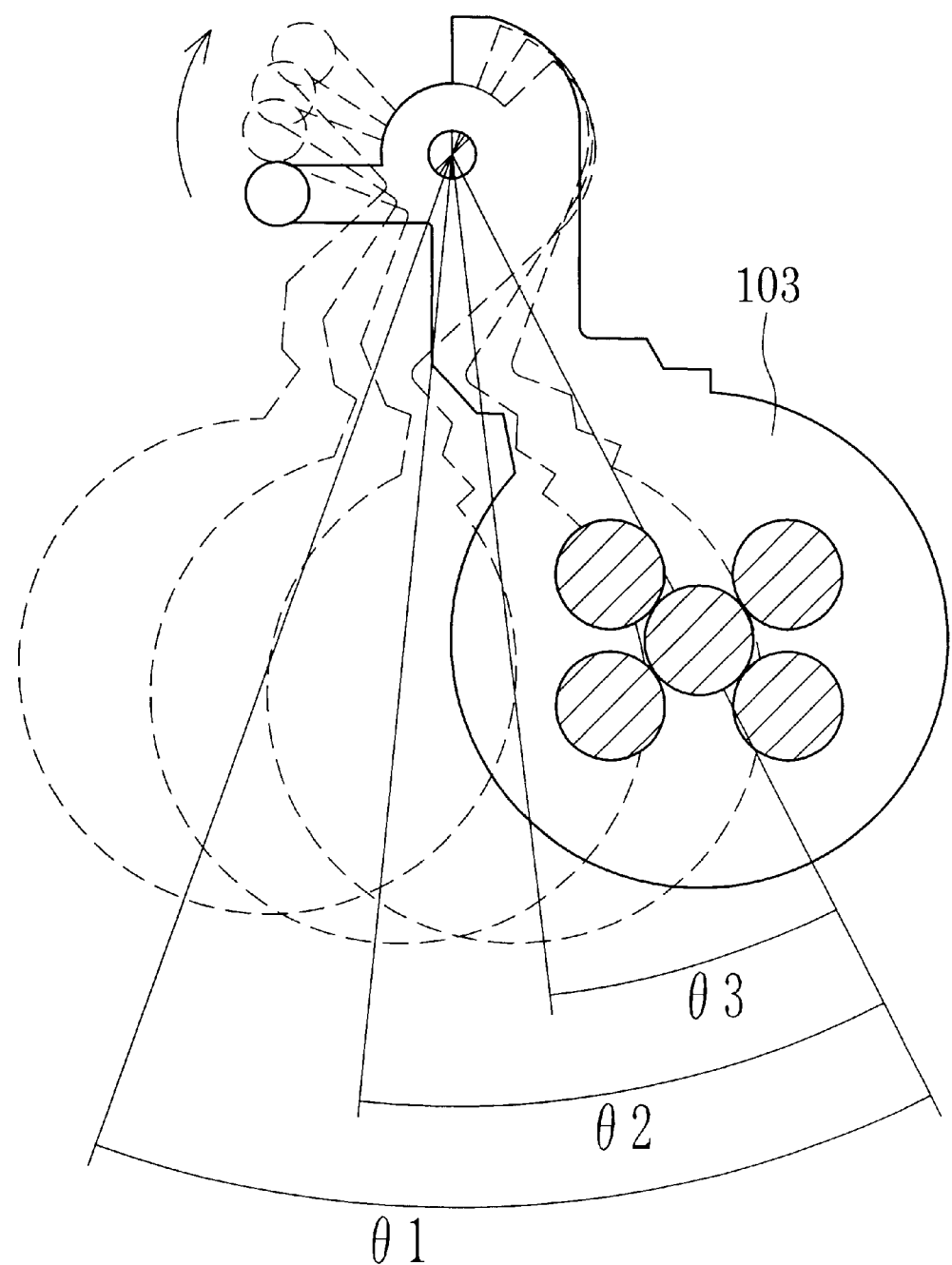
FIG. 17 is an explanatory view of the rotation of the shutter blade.
Figure 18A:
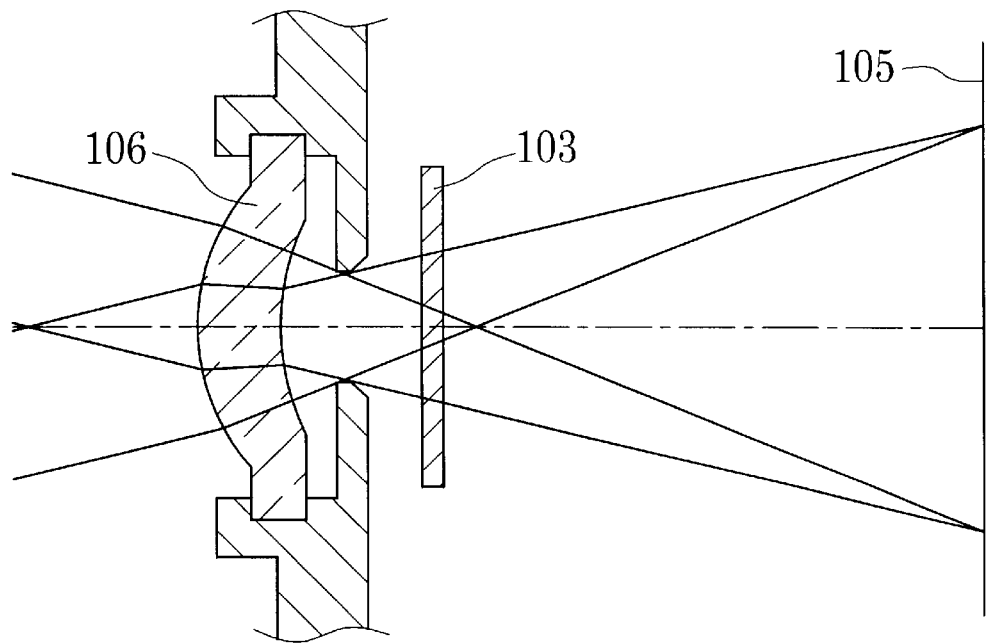
FIG. 18A is a explanatory view illustrating optical path of incident light, in which a wide-angle lens is set on an optical axis.
Figure 18B:
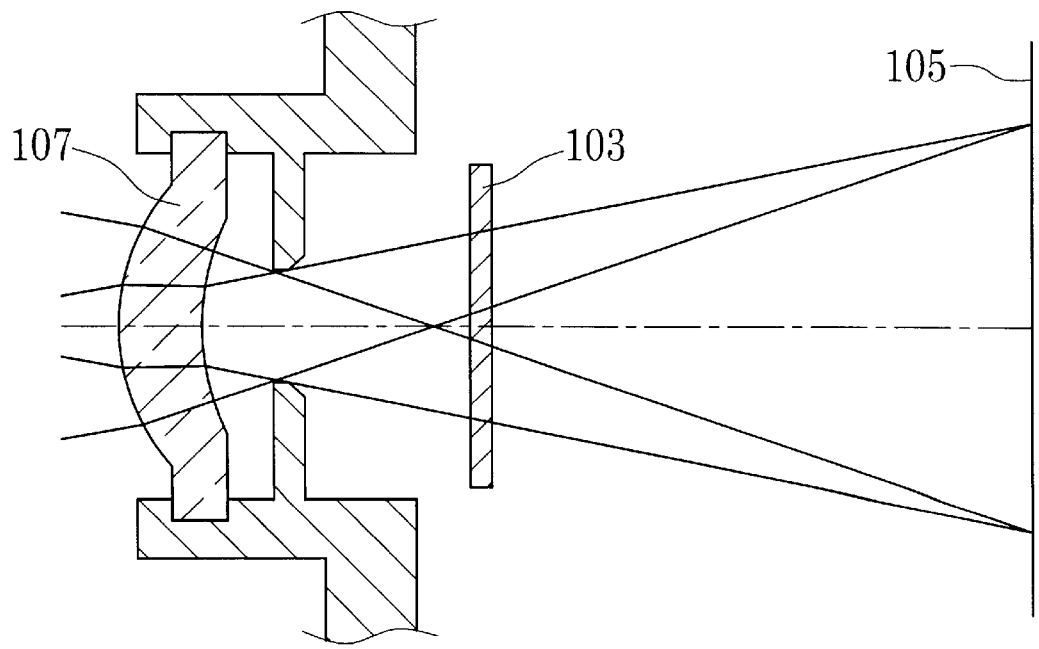
FIG. 18B is a view similar to FIG. 18A, but in which a telephoto lens is set.

An exposure time is calculated as follows, supposed that the shutter blade 43 moves in uniform motion. As illustrated in FIG. 17, the angle at which the shutter blade 43 opens completely is defined as θ1. Let θ2 be an angle at which the shutter blade 43 is so swung as to allow passage of the central fluxes. Let θ3 be an angle at which the shutter blade 43 comes to block the central fluxes. Referring to the graph illustrated in FIG. 7, the exposure time of the central area is expressed as follows:

$$T0=2\times\{θ1-(θ2+θ3)/2\}$$

The exposure time in peripheral area Ti is calculated in a similar way, and the proportion of the exposure time to the central area exposure time is calculated in dividing Ti by T0.

However, when the rotational speed of the shutter blade 43 is not uniform, it is preferable to calculate the exposure difference by measuring the density in the exposed area. In this case, it is more preferable to apply the density range where the characteristic curve is nearly straight over the whole of the exposed area of the photo film 23. Moreover, it is necessary to measure the density of the area shifted to the winding direction, in consideration of the shift of stopped position of the photo film 23.

TABLE 3

| | LEFT | CENTER | RIGHT |
|---|---|---|---|
| UPPER | −0.82 | — | −0.57 |
| CENTER | — | 0.00 | — |
| LOWER | −1.05 | — | −0.69 |

According to Tab. 3, the exposure amount in the right upper area is the largest among the four corners, and the smallest is the left lower area. The exposure difference E in this example is calculated as follows.

$$E=-0.57-(-1.05)=0.48(EV)$$

This value of E satisfies the condition (2).

Figure 8:
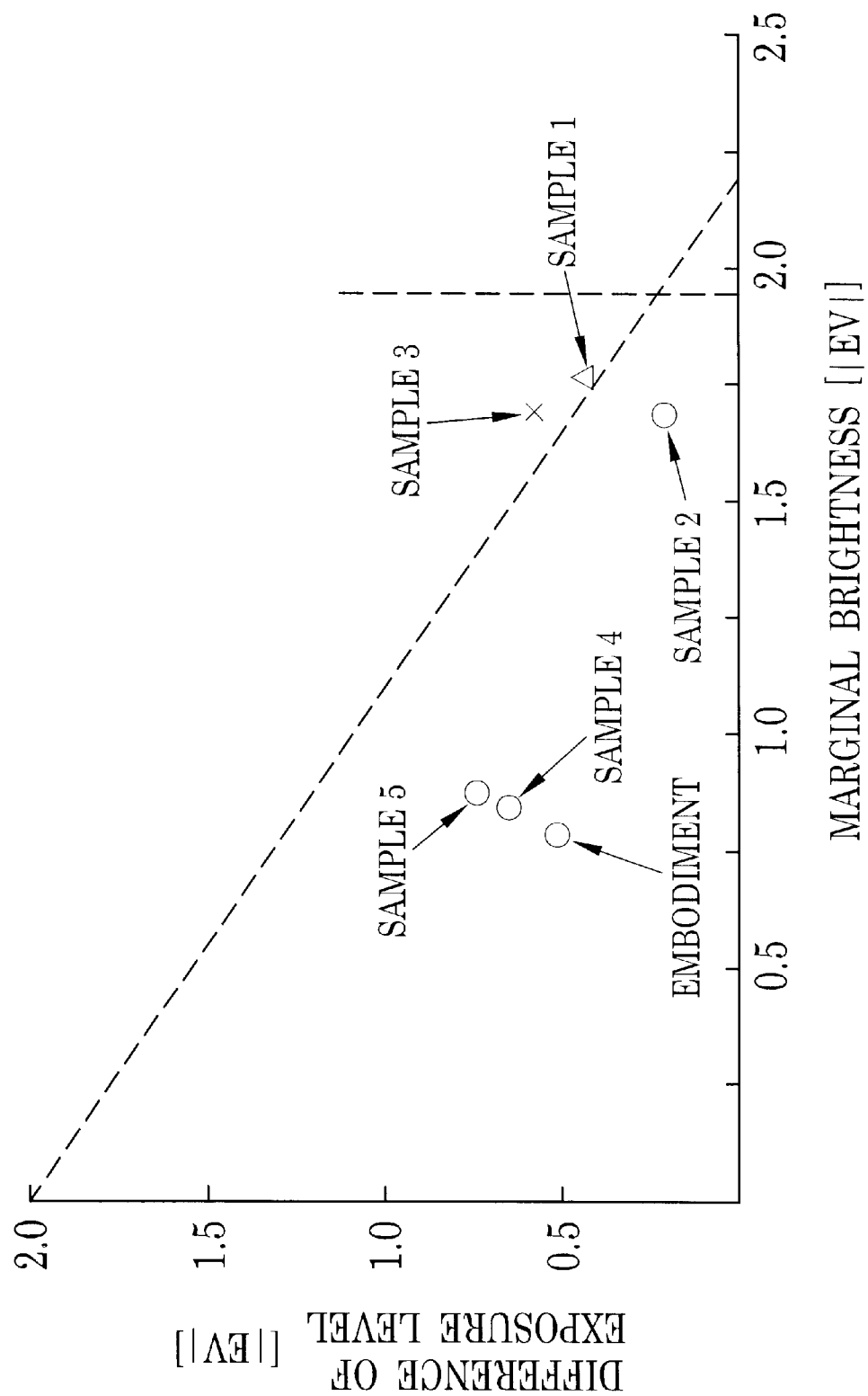
FIG. 8 is a graph illustrating an evaluation of exposure unevenness relative to a marginal brightness and an exposure difference.

The result in evaluating the exposure unevenness with some samples is shown in Table 4. This result is also illustrated in FIG. 8, in which the horizontal axis shows an absolute value of the proportion of marginal brightness L to the central brightness, which is shown in exposure value EV, and it means that the marginal brightness decreases according to the increase of its numerical value. On the other hand, the vertical axis shows an exposure difference E, calculated in the way described above, and it means that the exposure unevenness has a tendency to be conspicuous according to the increase of the value. In the drawing, the plotted data referred to as "EMBODIMENT" are those of their example in which the numerical values are substituted.

TABLE 4

| | L (%) | E (EV) | EVALUATION |
|---|---|---|---|
| SAMPLE 1 | 29.9 | 0.42 | Δ |
| SAMPLE 2 | 31.1 | 0.22 | ○ |
| SAMPLE 3 | 31.1 | 0.56 | × |
| EMBODIMENT | 57.9 | 0.48 | ○ |
| SAMPLE 4 | 56.1 | 0.64 | ○ |
| SAMPLE 5 | 55.5 | 0.70 | ○ |

In the "EVALUATION" column in this table, the mark "○" means a good result in which the exposure unevenness is not conspicuous, the mark "×" means a failing result in which the exposure unevenness is conspicuous, and the mark "Δ" means a middle degree between the two. The dotted lines shown in FIG. 8 mean the equal conditions of the conditions (1) and (2).

In FIG. 8, according to the result of SAMPLE 1 and SAMPLE 3, it is found that when the plotted point, determined by marginal brightness L and the exposure difference E, is near the dotted lines, the exposure unevenness is conspicuous and the image quality is low. According to the result of SAMPLE 2, it is found that when the marginal brightness L is small, the exposure difference E is required to be small, so that the exposure unevenness is not conspicuous. On the other hand, according to the results of SAMPLE 4 and SAMPLE 5, it is found that when the marginal brightness increases, the exposure unevenness has a tendency not to be conspicuous.

Figure 5B:
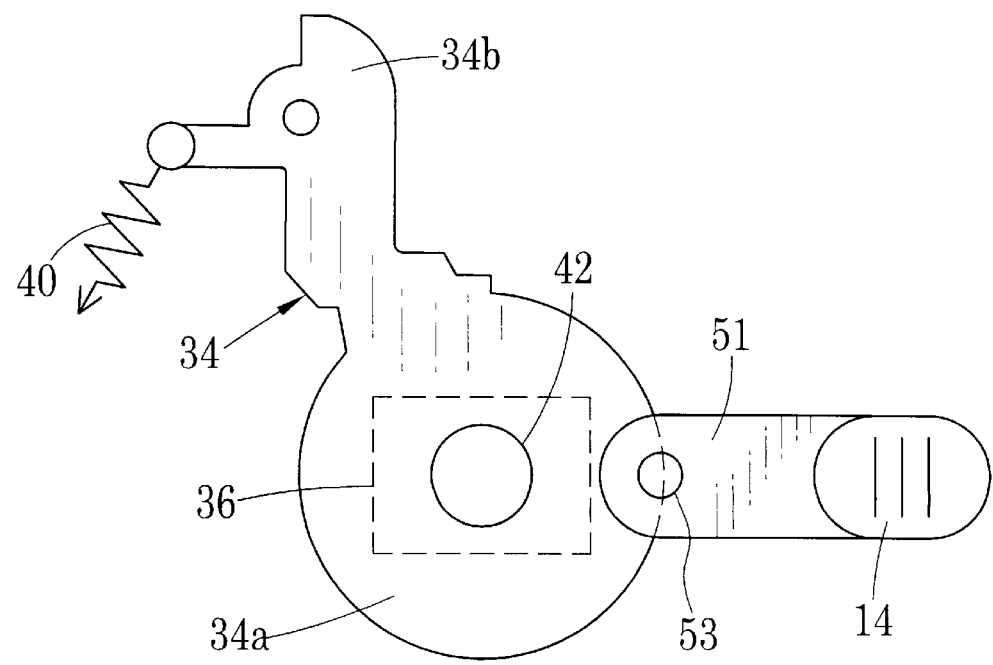
FIG. 5B is a schematic view similar to FIG. 5A, but in which a stop-down opening is retracted.

FIGS. 9 to 14 show an embodiment in which the shift of focal length is reduced even in a stop changeover. The schematic view of a film unit is the same as that shown in FIGS. 1 and 2, and the schematic view of an exposure unit is the same as that shown in FIGS. 3 to 5. Therefore, elements similar to those of the above embodiment are designated with identical reference numerals.

In this embodiment, the photographic lens 12 is constructed to satisfy the following condition:

$$δx·f1/F<0.06 \tag{3}$$

wherein F(mm) represents paraxial focal length of the photographic lens 12, δx(mm) represents the change of peak positions in MTF curves upon changing over the stop openings, satisfying the following condition:

$$u=20\times21.63/DL \tag{4}$$

wherein u(lines/mm) represents spatial frequency of MTF curves, DL represents half a length of a diagonal line of the frame area in the photo film 23.

The f-number of the photographic lens 12 is limited to satisfy the following condition:

$$1.7 \times f1 < F2 < 3 \times f1 \qquad (5)$$

wherein f1 represents the f-number at the time when the stop-down opening 50 is retracted from the optical axis 19, hereinafter called the open state, and f2 the f-number at the time when the stop-down opening 50 is inserted, hereinafter called the stop-down state.

When the value of f2 is set to the lower limit of the condition (5), the exposure through the exposure opening 42 has a difference of 1.53 EV than that through the stop-down opening 50. In general, a photo film has a latitude from −1.5 to +3.5, represented in the exposure value EV.

Figure 9A:
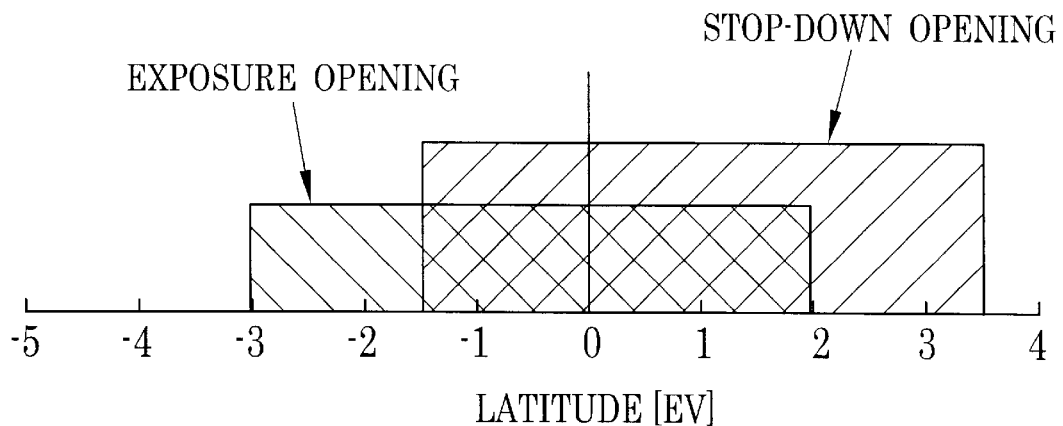
FIG. 9A is a graph illustrating the change of latitude by the stop changeover, in the condition F2=1.7×F1.

FIG. 9A illustrates the change of the latitude at the time when the value of f2 is set to the lower limit of the condition (5), and on the basis of the stop-down state. Since the overlap between ranges of latitude widens, it is possible to avoid failure in photography by the stop changeover. To the contrary, since the proper exposure range narrows, it is difficult to take an exposure properly even with changes of exposure condition. Therefore, it is not preferable to set the value of f2 less than the lower limit of the condition (5).

Figure 9B:
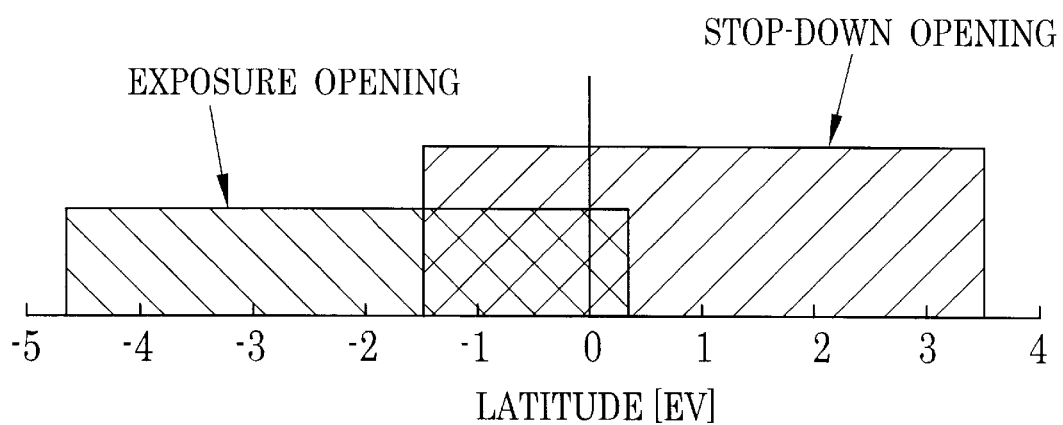
FIG. 9B is a graph similar to FIG. 9A, in the condition F2=3×F1.

FIG. 9B illustrates the change of the latitude at the time when the value of f2 is set to the upper limit of the condition (5), and the basis of the stop-down state. Since the proper exposure range widens, it is possible to consider the changes of exposure condition. To the contrary, since the overlap between ranges of latitude narrows, the possibility of failure in photography increases. Therefore, it is not preferable to set the value of f2 more than the upper limit of the condition (5).

Numerical values for this embodiment according to the present invention will be described below. The data of the photographic lens 12 are the same as those shown in Table 1 and Table 2.

F=33.40 (mm)
f1=8.05
f2=18.00
d=21.63 (mm)
δx1=−0.17 (mm)
δx2=−0.05 (mm)
δx=0.12 (mm)

Designated at F is the paraxial focal length of the photographic lens 12, f1 the f-number of the photographic lens 12 in the open state, f2 the f-number in the stop-down state, and d the half diagonal length in a standard frame size of the 135 type photo film (24×36 mm), δx1 and δx2 the shift of the peak position from the center of the MTF curve when the monochromatic light (wavelength: 587.56 nm) is irradiated to the photographic lens 12, wherein δx1 is the value in the open state δx2 the value in the stop-down state. And δx is the absolute value of the difference between δx1 and δx2. In this case, the condition (4) is satisfied because $$\delta x \cdot f1/F \approx 0.029 < 0.06$$

The values of f1 and f2 also satisfy the condition (5).

Figure 10:
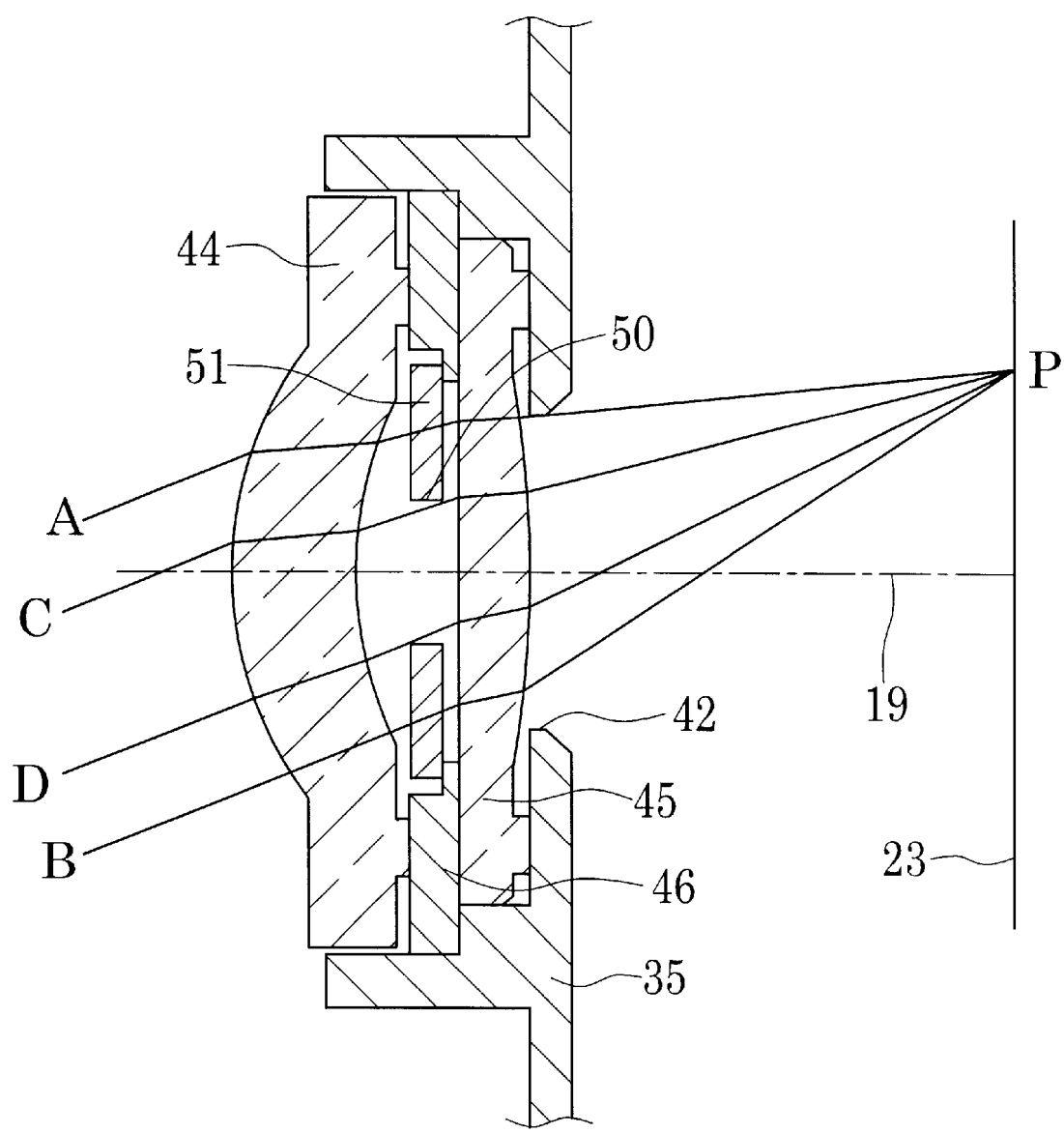
FIG. 10 is an explanatory view illustrating optical path of incident light, in which marginal section of incident light is cut by a stop plate.

FIG. 10 is the schematic diagram of a light path of the incident light which focuses on the point P, where the height from the optical axis 19 is 0.35×d2, wherein d2 is defined as the diagonal length of the printing area in the 135 type photo film (22.5×32.07 mm). In the open state, incident light ranged from A to B in this figure reaches the point P. On the other hand, in the stop-down state, peripheral part of incident light is blocked by the stop-down opening 50, so incident light ranged from C to D in this figure reaches the point P.

Figure 11:
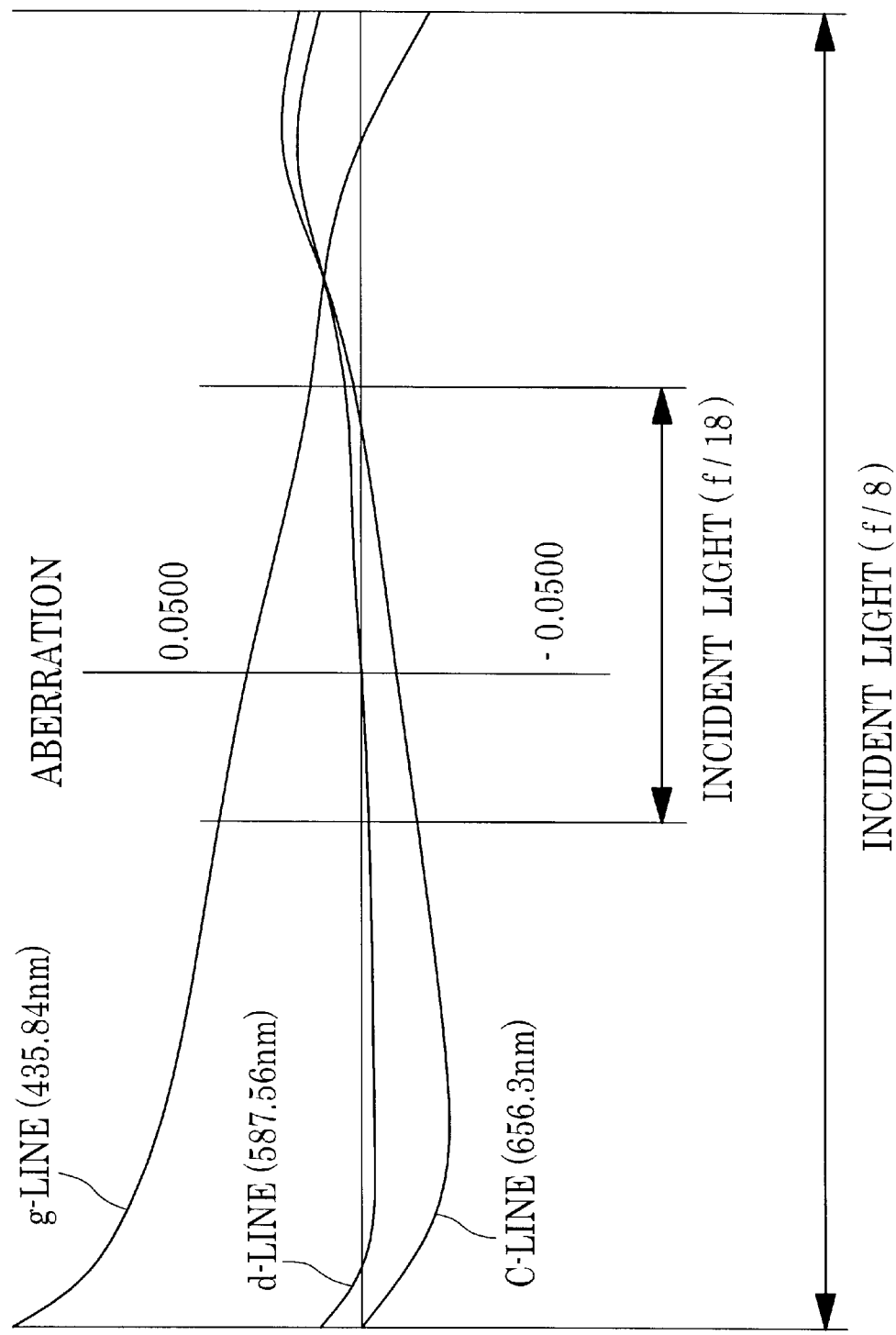
FIG. 11 is a graph illustrating lateral aberration of the photographic lens.

FIG. 11 shows the lateral aberration of incident light focusing on the point P, as shown in FIG. 10. The g-line (wavelength: 435.84 nm), the d-line (wavelength: 587.56 nm), and the C-line (wavelength: 656.3 nm) are applied as the incident light. The curvature is considered in the aberration, in which the radius is −149.3 mm in the diagonal direction of the frame area of the photo film 23. When the stop-down opening 50 is inserted, the incident light having large chromatic aberration is cut by the stop-down opening 50. Therefore, inserting the stop plate 51 between the first lens element 54 and the second lens element 55 makes it possible to improve a quality of a printed image.

Figure 12A:
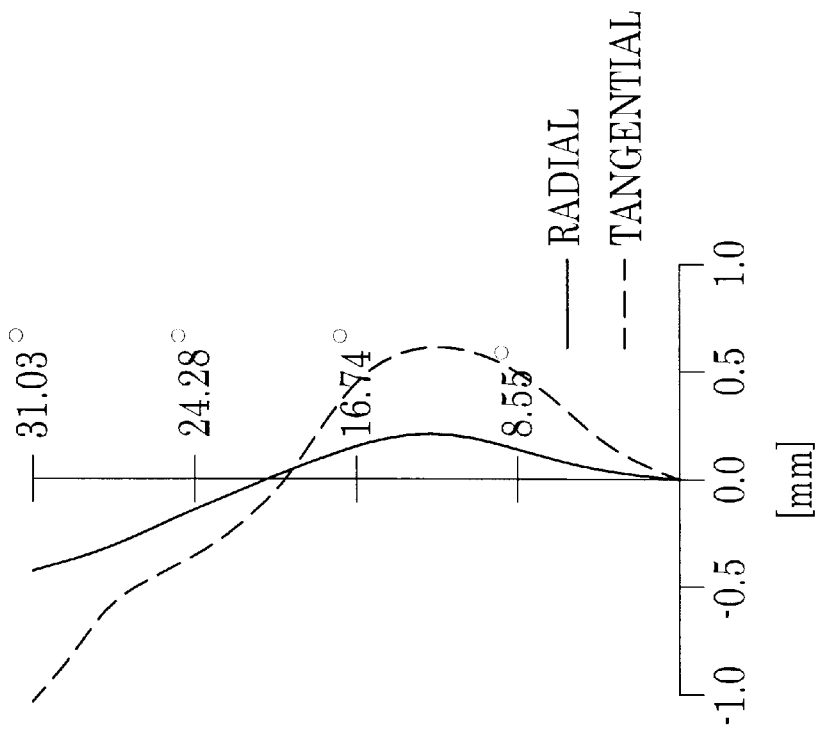
FIG. 12A is a graph illustrating spherical aberration of the photographic lens, in which a stop-down opening is retracted from an optical axis.
Figure 12B:
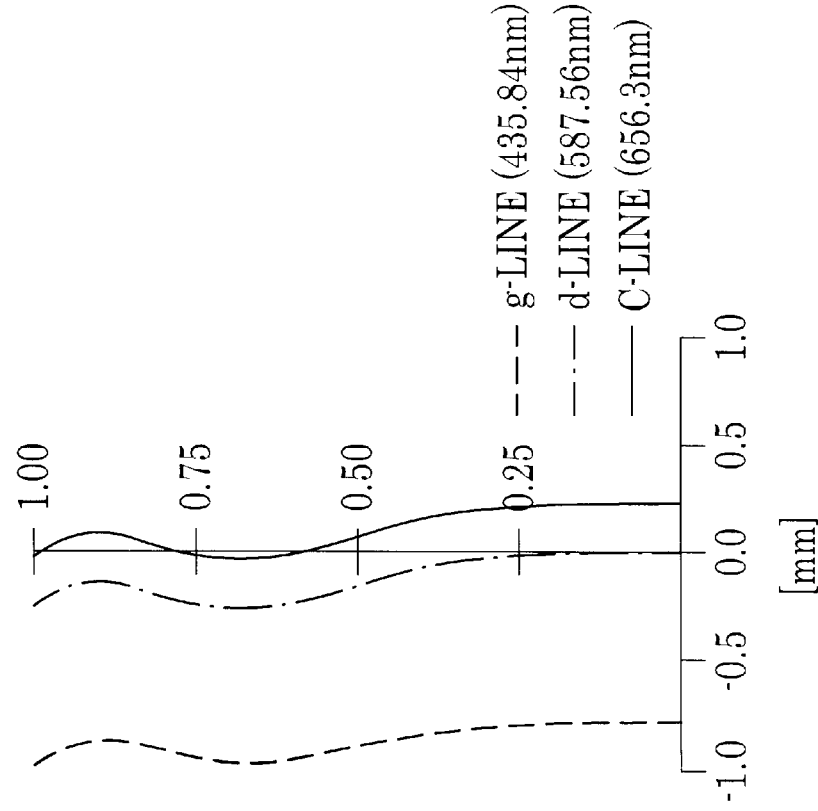
FIG. 12B is a graph illustrating curvature of the field, in which a stop-down opening is retracted from an optical axis.
Figure 13A:
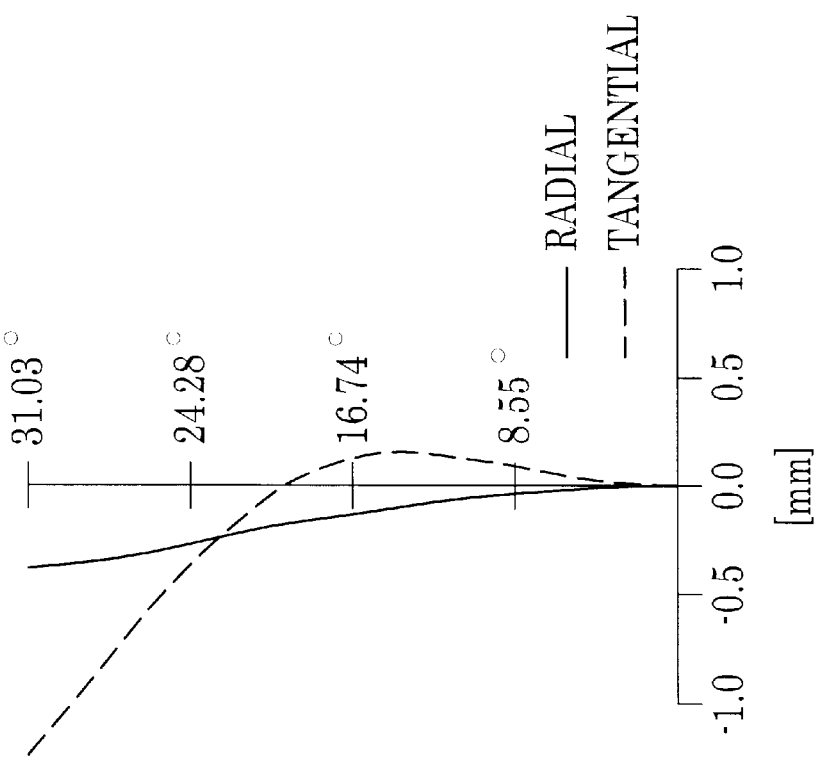
FIGS. 13A and 13B is a graph similar to FIGS. 12A and 12B, but in which a stop-down opening is inserted.
Figure 13B:
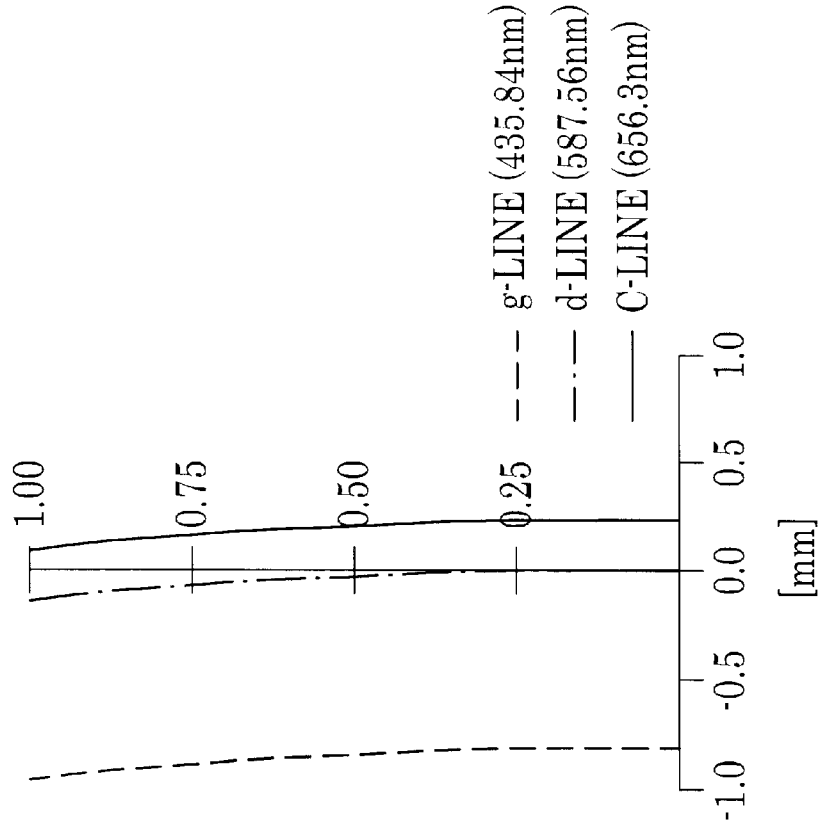

FIGS. 12A and 12B show the spherical aberration and the curvature of the field of the photographic lens 12 in the open state respectively, wherein the solid line and the dotted line in FIG. 12B represent the aberrations with respect to the radial image surface and the tangential image surface respectively. The curvature of the field is represented as the aberration from the image surface at the time when the curvature, the radius of which is −149.3 mm in the diagonal direction of the exposed area of the photo film 23, is considered. FIGS. 13A and 13B are similar to FIGS. 12A and 12B but for the stop-down state.

Figure 14:
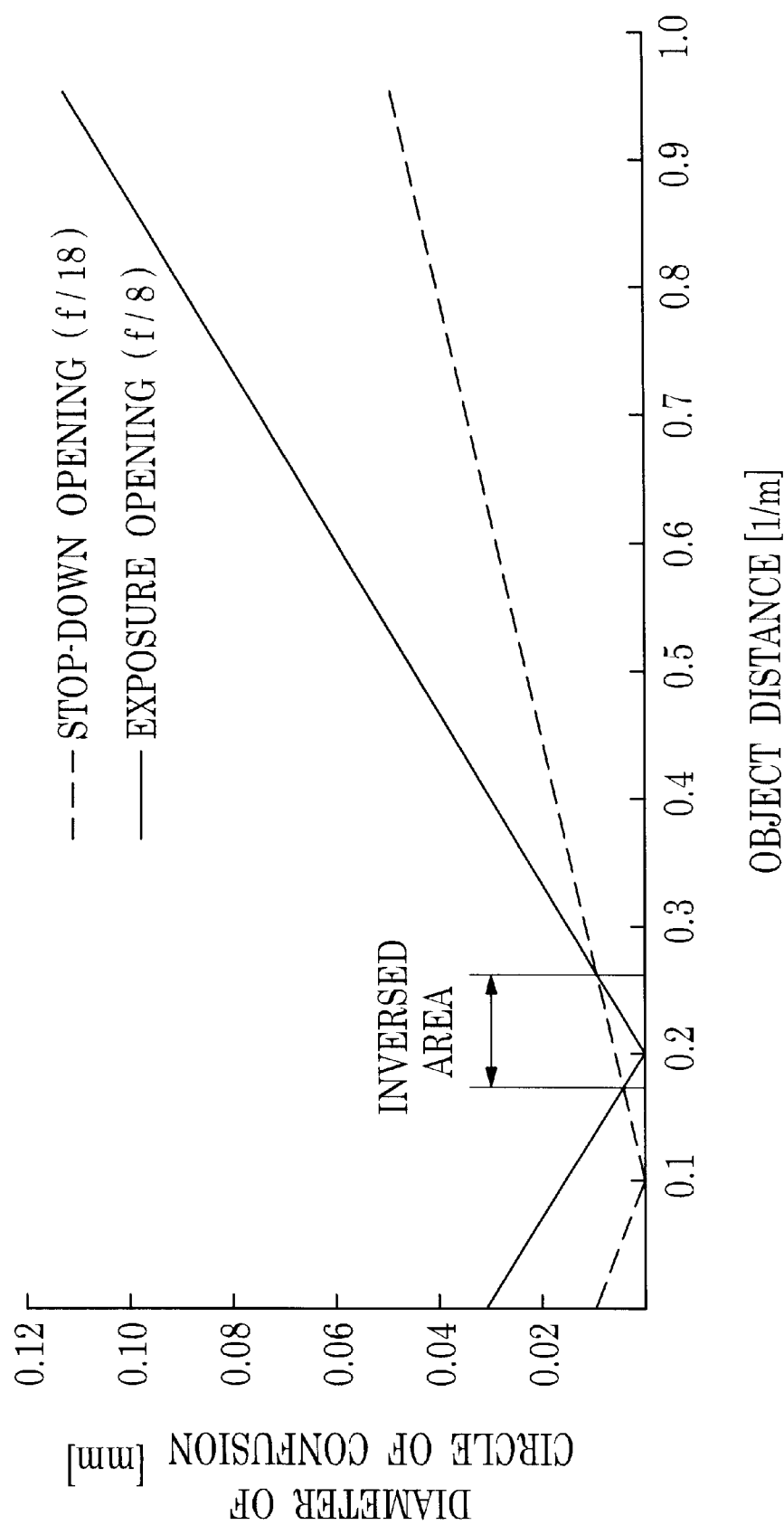
FIG. 14 is a graph illustrating a diameter of a circle of confusion relative to subject distance.
Figure 15A:
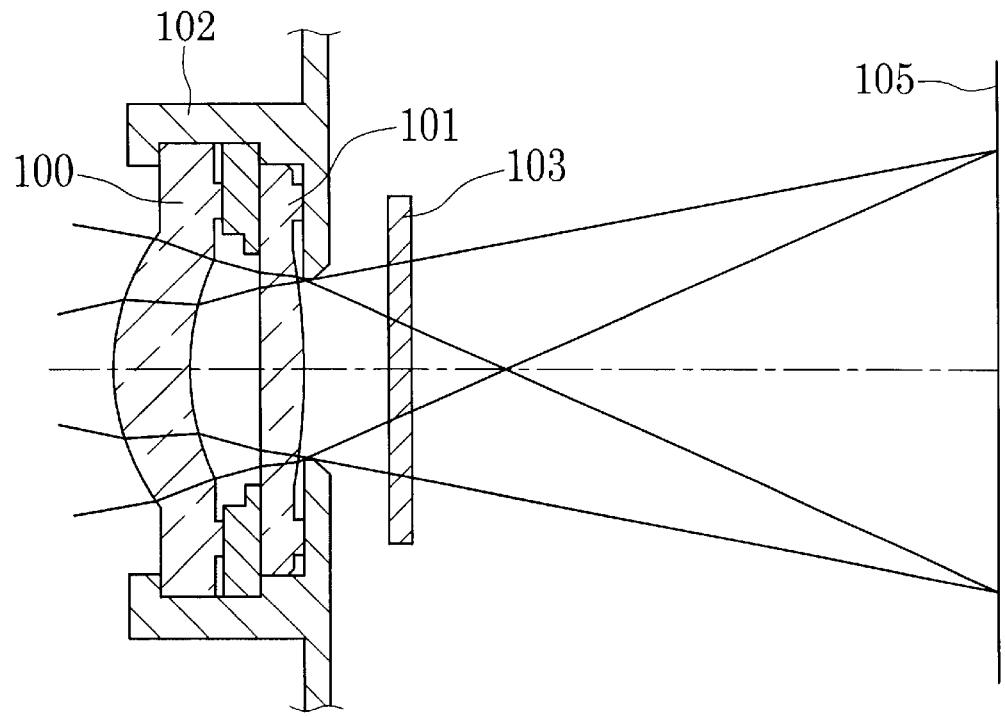
FIG. 15A is a explanatory view illustrating optical path of incident light, in which a stop-down opening is retracted from an optical axis.
Figure 15B:
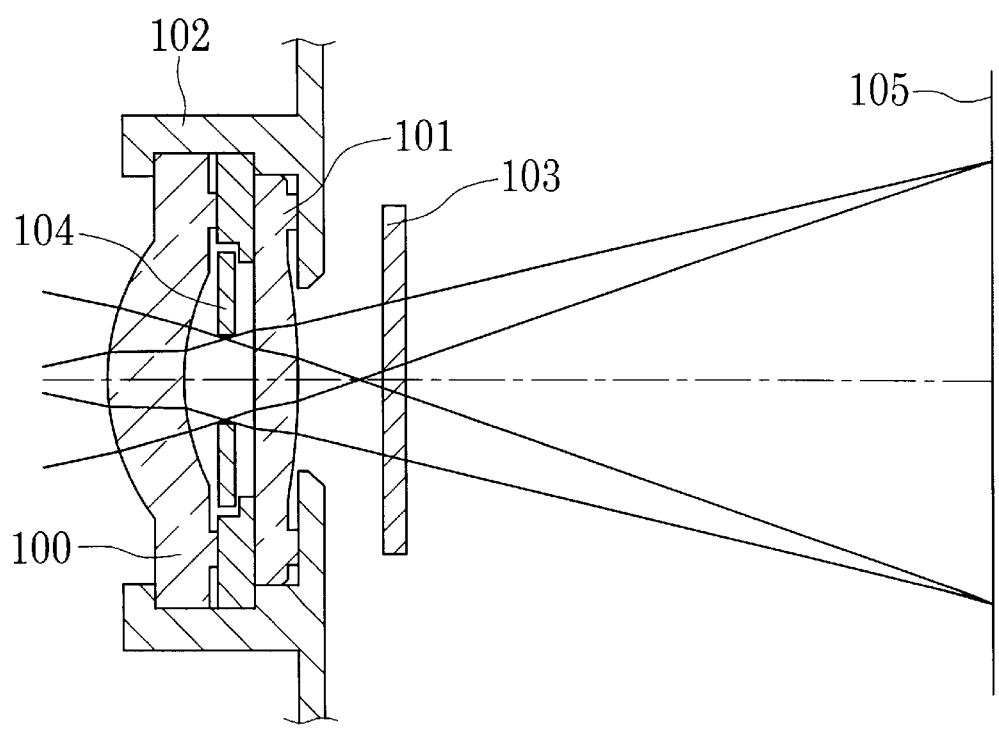
FIGS. 15B and 16B is a view similar to FIGS. 15A and 16A, but in which a stop-down opening is inserted.
Figure 16A:
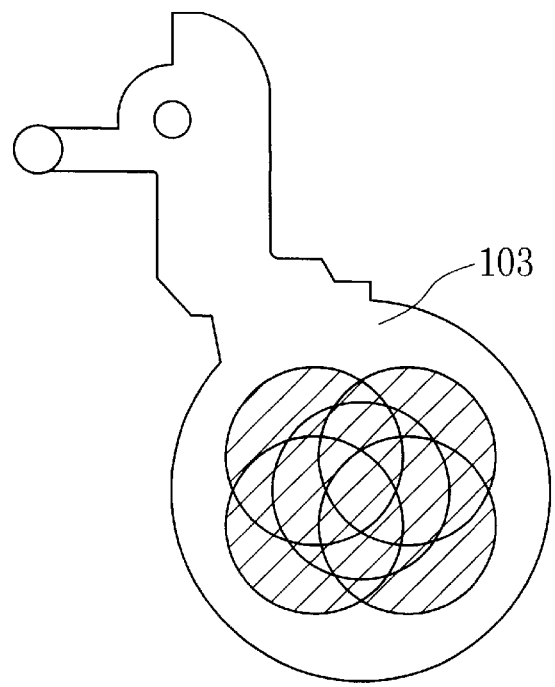
FIG. 16A is a explanatory view illustrating fluxes of incident light irradiated at the shutter blade, in which a stop-down opening is retracted from an optical axis.
Figure 16B:
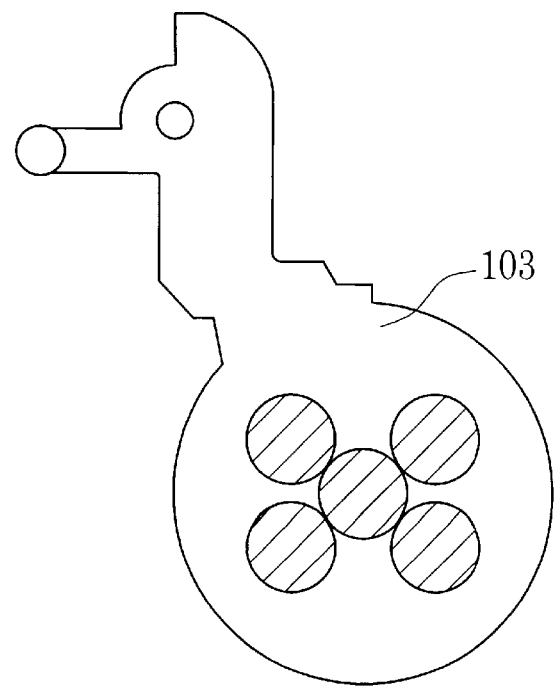

FIG. 14 shows the change of the diameter of circle of confusion, according to the object distance. As the condition (4) is satisfied, the shift of the focus decreases even when the aperture stop is changed over. Because the inversed area of the diameter of the circle of confusion narrows, it is possible to improve the image quality by stopping down.

In the above embodiments, a flash unit is omitted. The present invention is also applicable to a film unit having a flash unit. A flash unit makes it possible to photograph with a proper exposure under an extremely dark photographing condition.

In the above embodiments, 135 type photo film is used. Alternatively, IX-240 type photo film can be used in the present invention.

Thus, the present invention is not to be limited to the above embodiments, but on the contrary, various modifications are possible to those skilled in the art without departing from the scope of claims appended hereto.

What is claimed is:

1. A lens-fitted photo film unit comprising at least one photographic lens for forming a frame on a photo film, and a stop changer disposed on an optical axis of said photographic lens for controlling an amount of subject light, said stop changer being capable of changing over at least at a first position and a second position, making an f-number of said photographic lens f1 when at said first position, making said f-number of said photographic lens f2 when at said second position, wherein f2>f1:

said lens-fitted photo film unit satisfying the following conditions:

$$|\log_2(L/100)| < 1.9$$

$$0 < E \leq 2 - 0.91 \times |\log_2(L/100)|$$

wherein L(%) represents a proportion of brightness in a marginal portion of said frame to brightness in a central portion of said frame at the time when said stop changer is at said second position, and E(EV) represents a difference between the maximum exposure amount and the minimum exposure amount in said marginal portion of said frame.

2. A lens-fitted photo film unit as claimed in claim 1, further comprising a shutter blade for effecting an opening/ closing operation on said optical axis by swinging so as to expose said photo film;

wherein said stop changer comprises:

a first stop opening for controlling said subject light to make said f-number f1 when at said first position; and a second stop opening for controlling said subject light to make said f-number f2 when at said second position, said second stop opening being disposed further from said shutter blade than said first stop opening.

3. A lens-fitted photo film unit as claimed in claim 2, wherein said shutter blade is disposed behind said stop changer, and said second stop opening is disposed in front of said first stop opening.

4. A lens-fitted photo film unit as claimed in claim 2, wherein said first stop opening is larger than said second stop opening.

5. A lens-fitted photo film unit as claimed in claim 4, wherein said first stop opening is fixed on said optical axis; and said stop changer comprises a movable stop plate, including said second stop opening, being away from said optical axis when at said first position, setting said second stop opening on said optical axis when at said second position.

6. A lens-fitted photo film unit as claimed in claim 5, wherein said photographic lens comprises at least a first lens element and a second lens element, and said stop plate movable into a space provided between said first and second lens elements.

7. A lens-fitted photo film unit as claimed in claim 4, wherein said at least one photographic lens is a first photographic lens and a second photographic lens having focal lengths different from one another; and said stop changer comprises a movable board, including said first and second stop openings, for holding said first and second photographic lenses in front of said first and second stop openings respectively, for setting said first stop opening and said first photographic lens on said optical axis when at said first position, and for setting said second stop opening and said second photographic lens on said optical axis when at said second position.

8. A lens-fitted photo film unit as claimed in claim 7, wherein said board is manually operable externally.

9. A lens-fitted photo film unit as claimed in claim 1, further satisfying the following condition:

$$\delta x \cdot f1/F < 0.06$$

wherein F(mm) represents paraxial focal length of said photographic lens, δx(mm) represents a shift of peak positions in MTF curves upon changing over said stop changer, satisfying the following condition:

$$u = 20 \times 21.63/DL$$

wherein u(lines/mm) represents a spatial frequency of said MTF curves, DL(mm) represents half a length of a diagonal line of said frame.

10. A lens-fitted photo film unit comprising at least one photographic lens for forming a frame on a photo film, and a stop changer disposed on an optical axis of said photographic lens for controlling an amount of subject light, said stop changer being capable of changing over at least at a first position and a second position, making an f-number of said photographic lens f1 when at said first position, making said f-number of said photographic lens f2 when at said second position, wherein f2>f1;

said lens-fitted photo film unit satisfying the following condition:

$$\delta x \cdot f1/F < 0.06$$

wherein F(mm) represents paraxial focal length of said photographic lens, δx(mm) represents a shift of peak positions in MTF curves upon changing over said stop changer, satisfying the following condition:

$$u = 20 \times 21.63/DL$$

wherein u(times/mm) represents a spatial frequency of said MTF curves, DL(mm) represents half a length of a diagonal line of said frame.

11. A lens-fitted photo film unit as claimed in claim 10, further satisfying the following condition:

$$1.7 \times f1 < f2 < 3 \times f1$$

12. A lens-fitted photo film unit as claimed in claim 11, wherein said stop changer comprises:

a first stop opening for controlling said subject light to make said f-number f1 when at said first position; and a second stop opening for controlling said subject light to make said f-number f2 when at said second position.

13. A lens-fitted photo film unit as claimed in claim 12, wherein said first stop opening is fixed on said optical axis and larger than said second stop opening; and said stop changer comprises a movable stop plate, including said second stop opening, being away from said optical axis when at said first position, setting said second stop opening on said optical axis when at said second position.

14. A lens-fitted photo film unit as claimed in claim 10, further satisfying the following conditions:

$$|\log_2(L/100)| < 1.9$$

$$0 < E \leq 2 - 0.91 \times |\log_2(L/100)|$$

wherein L(%) represents a proportion of brightness in a marginal portion of said frame to brightness in a central portion of said frame when said stop changer is at said second position, and E(EV) represents a difference between the maximum exposure amount and the minimum exposure amount in said marginal portion of said frame.

* * * * *